Feb. 20, 1962     O. EDSTRÖM     3,021,600

PEEP SIGHT

Filed March 23, 1959

INVENTOR
OLLE EDSTRÖM

United States Patent Office 3,021,600
Patented Feb. 20, 1962

3,021,600
PEEP SIGHT
Olle Edström, Sillerbo, Tallasen, Sweden, assignor to Aktiebolaget O. Edströms Snickerifabrik, Tallasen, Sweden
Filed Mar. 23, 1959, Ser. No. 801,370
Claims priority, application Sweden Apr. 11, 1958
6 Claims. (Cl. 33—47)

The present invention has for its object to eliminate the shortcomings generally being inherent in the usual so called peep sights. A peep sight generally consists of a peep hole disc through which the shot aims. On account of the light deflection occurring at the edges of a peep hole and which adds visually as a diffusing factor on the blur said edges present because of the fact that the lens of the eye is focused on objects far away, the target appearing in the peep hole often obtains indistinct contours and the aiming becomes very trying. According to the present invention a screen having an aperture of greater diameter than the hole in the peep hole disc is arranged at a certain distance from said disc. This screen masks the annoying light rays deflected at the hole of the first disc, which masking action causes a reduction of the blur of the image. By means of such a device a much clearer image of the target is obtained.

Figure 1:
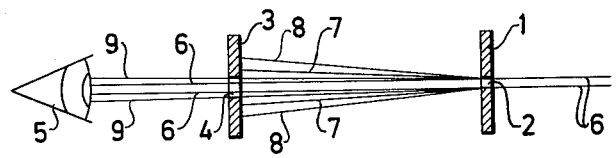
Figure 2:
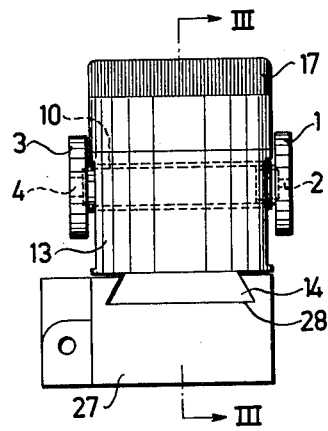
Figure 3:
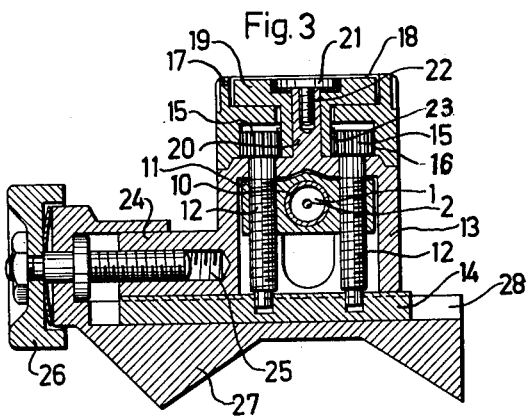

The invention will be explained in greater detail with reference to the attached drawing, wherein FIG. 1 shows the ray passage in a peep sight according to the invention, and FIGS. 2 and 3 show a practically useful embodiment of the invention.

According to FIG. 1 there is arranged a conventional peep hole disc 1 with a hole 2. At a certain distance a screen 3 with an aperture 4 is disposed. An aiming eye is denoted 5. From a target, which is assumed to be at infinity, parallel rays 6 are incident. The central portion of this beam passes unaffected through the holes 2 and 4 of the peep hole disc 1 and the screen 3, respectively, and meets the eye. The outer portions of the beam 6, however, is subjected when passing through the hole 2 to optical deflection, and rays 7, 8 appear around the centre of the beam 6. The deflected rays, which in peep sights previously known contributed essentially towards blurring the target image when they were caught by the eye, are now masked according to the invention by the arrangement of the screen 3. The aperture 4 is larger than the hole 2 as otherwise a risk of light deflection should exist at the aperture 4 also. It is true, on account of the larger dimensions of the aperture 4, that rays deflected from the peep hole 2 are let through to a certain extent, such as the rays 9, but these have so little importance that they are negligible and do not affect the final success attained by the invention.

FIGS. 2 and 3 show a suitable and practical embodiment of a peep sight according to the invention, FIG. 3 being a section along line III—III of FIG. 2. In this device the peep hole disc 1 and the screen 3 are disposed each at one end of a tube 10. The disc 1 is provided with a thread and screwed into the front end to make it possible to replace this disc by discs having another diameter of the hole. The surface of screen 3 is deadened, for instance by blasting, in order to prevent light reflexes. The tube 10 is mounted in a nut member 11, into which two screws 12 are threaded. The top ends of these screws are journalled in a housing 13 and the opposite ends of the screws are journalled in a plate 14. The top ends of the screws 12 are provided with gears 15 for cooperating with a gear ring 16 on the inner side of a cap 17, which is rotatably mounted at the top end of the housing 13. The whole sight may be raised and lowered as a single unit for adjustment to various ranges by the cap 17 being turned. Thanks to the gear reduction the cap 17 need be turned one revolution only for the sight to move between its two limit positions. If the gear reduction is such that the screws 12 make five revolutions when the cap 17 is turned one revolution and if the screw pitch is 1 mm., a displacement of the peep sight of 5 mm. is obtained, which means in practice, using conventional rifles, a range variation of 100 to 600 meters. Thus, the cylindrical periphery of the cap 17 may be divided directly into meters. In this case there is no need for any counting of the revolutions, as distinct from many existing peep sights, inasmuch as the cap can be turned one revolution only. The upper part of the cap 17 is provided with a recess 18, in which a circular disc 19 is rotatably disposed. This disc 19 is journalled on a pin 20 and is retained by means of a screw 21. The pin 20 is integral with or otherwise secured to the housing 13. A hollow shaft 22 is telescoped over the pin 20, said shaft being secured at its one end to the disc 19 and provided at its opposite end with a gear rim 23 for cooperation with the gears 15. By this disc a fine adjustment of the range setting may be obtained, as the gear ratio between the gear rim 23 and the gears 15 is 1:1.

The housing 13 is provided on one side (see FIG. 3) with a projecting portion 24, which has a threaded bore 25 for cooperation with a screw 26 journalled in one end of a support plate 27, which is secured to the rifle, not otherwise shown. In the support plate 27 a dove tail groove 28 is formed, in which the plate 14 may slide. The latter plate serves as a slidable carriage for the complete sighting device. By means of the screw 26 the peep sight may be adjusted laterally.

Within the scope of the invention the practical construction of the peep sight may be carried out in many ways. It is not necessary to combine the peep hole disc and the screen by means of a tube, although this is a recommendable embodiment, but these items may be mounted independent of one another. The ranging device may also be constructed otherwise than shown and described in the foregoing. However, it is essential that the screen as well as the peep hole disc are actuated simultaneously by the ranging device so that their mutual relation is substantially maintained.

What is claimed is:

1. A peep sight for aiming a gun and the like at a target, comprising, in combination, two disks formed with a smaller and a larger opening therein respectively, each of said disks haivng a face about the respective opening; and a support carrying said disks in spaced relationship, the cross sectional area of the opening farther away from said target being greater than that of the opening nearer said target, said openings defining the optical axis of said sight, and said faces being arranged opposite each other and axially defining therebetween an optical channel having a cross section about said axis greater than the larger one of said openings, and an axial length substantially greater than the greatest cross sectional dimension of said greater opening.

2. A peep sight for aiming a gun and the like at a target, comprising, in combination, a tubular support member defining an optical channel therethrough; and two disk means mounted on said support transversely of said channel in spaced relationship, said disk means being formed with aligned respective openings therein defining the optical axis of said sight, said openings being of different cross sectional area, the cross sectional area of the opening farther away from said target being greater than that of the opening nearer said target, the cross sectional area of said channel being substantially greater than the cross sectional area of the greater one of said openings, and the spacing of said disk means being substantially greater than the greatest cross sectional dimension of said opening.

3. A peep sight for aiming a gun and the like at a target, comprising, in combination, a carrier member; a tubular support member defining an optical channel therethrough; means for adjustably mounting said tubular support member on said carrier member; and two disk means mounted on said support transversely of said channel in spaced relationship, said disk means being formed with aligned respective openings therein defining the optical axis of said sight, said openings being of different cross sectional area, the cross sectional area of the opening farther away from said target being greater than that of the opening nearer said target, the cross sectional area of said channel being substantially greater than the cross sectional area of the greater one of said openings, and the spacing of said disk means being substantially greater than the greatest cross sectional dimension of said greater opening.

4. A peep sight as set forth in claim 3, said adjustable mounting means including two screw means mounted on one of said members for rotation about parallel respective axes and threadedly engaging the other one of said members, and means for jointly rotating said two screw means.

5. A peep sight as set forth in claim 4, said means for rotating said screw including gear means on each of said screw means and a gear simultaneously meshing with said gear means.

6. A peep sight as set forth in claim 4, further comprising adjusting means mounted on one of said members for moving the other one of said members in a direction transverse of said axes.

References Cited in the file of this patent

UNITED STATES PATENTS

| | | |
|---|---|---|
| 293,058 | Moore | Feb. 5, 1884 |
| 982,151 | Marble | Jan. 17, 1911 |
| 1,573,515 | Harkom | Feb. 16, 1926 |
| 2,162,090 | King | June 13, 1939 |
| 2,543,123 | Neal | Feb. 27, 1951 |
| 2,550,694 | Hazen et al. | May 1, 1951 |